Aug. 3, 1943.                W. A. FLUMERFELT                2,325,845
                                JOINT CONSTRUCTION
                            Original Filed June 5, 1940

INVENTOR
William A. Flumerfelt
BY
Braselton, Whitcomb Davies

Patented Aug. 3, 1943

2,325,845

UNITED STATES PATENT OFFICE 2,325,845

JOINT CONSTRUCTION

William A. Flumerfelt, Columbus, Ohio, assignor to The Columbus Auto Parts Company, Columbus, Ohio, a corporation of Ohio Original application June 5, 1940, Serial No. 338,977, now Patent No. 2,280,634, dated April 21, 1942. Divided and this application March 9, 1942, Serial No. 434,017

8 Claims. (Cl. 287—85)

This invention relates to joint constructions and more especially to those of a character known as ball joints particularly adaptable for use in tie rod and drag link assemblies for automotive vehicles and is a division of my copending application entitled "Joint construction" bearing Serial No. 338,977, filed June 5, 1940, now Patent No. 2,280,634, dated April 21, 1942.

The invention has for an object the provision of a joint construction having a ball-like joint element of multi-sectional construction surrounded by bearing means, the component elements of the joint assembly being cushioned in a yieldable material.

The invention contemplates a ball type joint construction in which the spherical configuration is formed of a plurality of members and surrounded by a bearing means which engages the spherical configuration under pressure of a compressed rubber or synthetic rubber cushion.

Another object of the invention is the provision of a joint structure wherein metallic spring means have been eliminated and the elements of the joint assembly at all times are held together under pressure of a compressed yieldable material thus providing means for automatically compensating for any wear of the several bearing surfaces.

Another object of the invention resides in the provision of a joint structure which is of sealed construction with the lubricant initially injected into the joint at the time of assembly so that further lubrication of the structure during use becomes unnecessary.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawing of a form of the invention, which may be preferred, in which.

Figure 1:
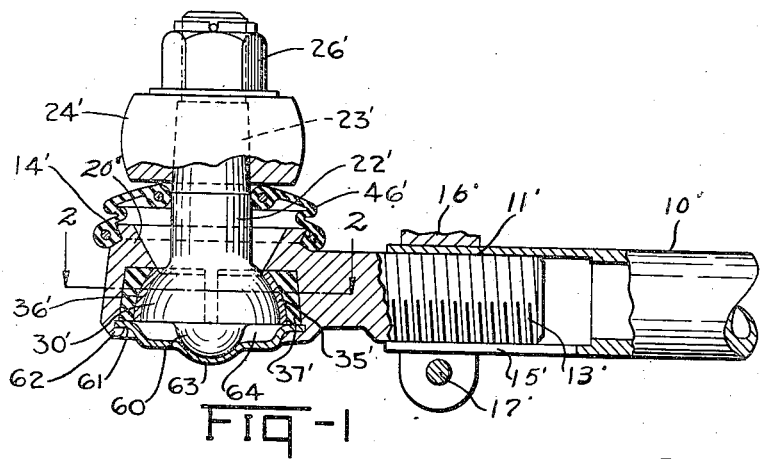
Figure 1 is a vertical sectional view illustrating a modified form of the joint construction.
Figure 2:
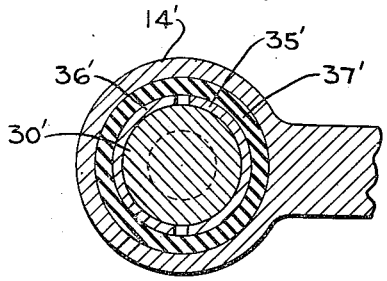
Figure 2 is a horizontal sectional view taken substantially on the line 2—2 of Figure 1.
Figure 3:
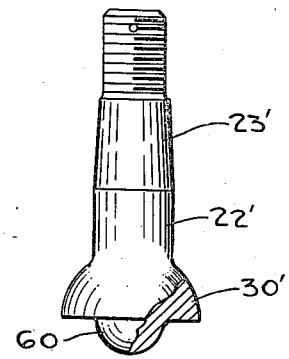
Figure 3 is a detailed view of the stud element forming part of the invention.
Figure 4:
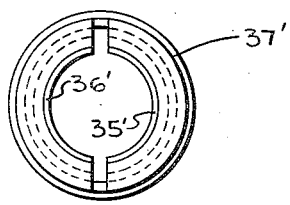
Figure 4 is a plan view of the bearing seats and flexible mounting therefor.

While I have illustrated the joint construction as especially adapted for a tie rod connection, it is to be understood that my invention may be used in any arrangement where it may be found to be applicable.

Referring to the drawing in detail, I have shown a form of joint construction especially arranged for making a tie rod connection to a dirigible or steerable wheel of a vehicle in which numeral 10' designates a tie rod of tubular formation which is interiorly threaded as at 11' to receive a threaded tenon 13' formed as an integral part of a joint housing 14'. The wall of the tube adjacent tenon 13' is split longitudinally as at 15' and surrounding the tube is a clamp or collar 16' arranged to be drawn into clamping engagement with tie rod tube 10' by means of bolt 17' and nut (not shown), this means serving to lock the tie rod tube and joint housing in fixed relation. The housing 14' is of hollow configuration which terminates at its upper extremity in an inwardly extending shoulder or flange 20', the interior walls of the housing 14' tapering or converging slightly at the upper portion of the housing.

The stud member 22' extending into the housing 14' is provided at its lower extremity with an enlarged semi-spherical portion 30' and with a second semi-spherical portion 60 of lesser dimension, the curvature of both the spherical portions 30' and 60 being generated about the same center. The stud member 22' is provided with an upwardly extending tapered portion 23' adapted to receive an arm 24' which forms a means for supporting a dirigible vehicle wheel (not shown), the arm 24' being held in place by means of nut 26'.

Figure 6:
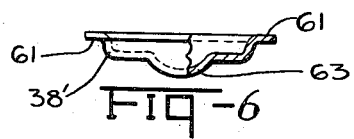
Figure 6 is an elevational view partly in section illustrating a closure element for the joint.
Figure 5:
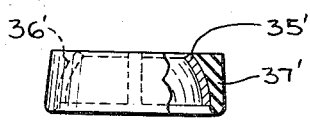
Figure 5 is a side elevational view partly in section of the elements shown in Figure 4.

Substantially surrounding the spherical portion 30' of the stud member are a pair of semi-annular bearing seats or members 35' and 36' which are slightly spaced apart to take up for any wear of the bearing surfaces. Interposed between the bearing seat members 35' and 36' and the interior walls of the housing 14' is an annular member 37' of rubber, synthetic rubber or other suitable flexible or yieldable material which at all times urges the bearing seats 35' and 36' into close bearing engagement with the enlarged portion 30' of the stud member. The lower portion of the housing is closed by means of a closure plate 38', the outermost flange 61 thereof engaging and compressing the rubber mounting 37' for the bearing seats, the housing being swaged over the flange portion 61 as at 62 to hold the joint elements in assembled relationship. It is to be noted that in Figure 5 the yieldable rubber element 37' in unassembled position extends downwardly below the bearing seats 35′ and 36′ and during assembly, the flange 61 of closure member 38′ compresses the rubber mounting into the position illustrated in Figure 1, the flange 61 also serving to hold the bearing seats 35′ and 35′ in position in the housing. The central portion of the closure member 38′ is provided with a partial spherical recess 63 which is adapted for engagement as illustrated in Figure 1 with the small spherical portion 60 of the stud member 22′ which provides additional bearing surface in the joint structure and at the same time the closure plate holds the stud element in close bearing engagement with the bearing seat members. As illustrated in Figures 1 and 6 the closure plate 38′ is so formed as to provide a chamber 64 between the enlarged portion 30′ of the stud member and the closure plate to form a lubricant chamber which may be initially filled with suitable lubricant at the time the joint is assembled. The upper end of the housing is closed by a suitable flexible closure member or boot 46′.

Thus, in the joint structure of my invention, all mechanical spring devices have been eliminated for holding the joint elements in their proper relationship as the rubber cushion 37′ provides the necessary resilient lateral pressure upon the bearing surfaces forming an effective yet highly efficient joint construction, the resilient cushion automatically compensating for any wear of the bearing surfaces which may occur.

In this form of the invention the overall dimension of the joint housing is diminished over prior constructions and a satisfactory joint produced with a minimum number of elements. Also, a joint of this arrangement may be lubricated at the time of assembly with sufficient lubricant to last for the normal life of the joint structure.

It is apparent that, within the scope of the invention, modifications and different arrangements may be made other than is herein disclosed, and the present disclosure is illustrative merely, the invention comprehending all variations thereof.

What I claim is:

1. A joint construction including a housing having a hollow interior; a stud member having an enlarged partially spherically shaped portion extending into said housing, said stud member having a second semi-spherically shaped portion of lesser dimension projecting beneath said enlarged partially spherically shaped portion; bearing means in said housing having curved interior surfaces fitting the enlarged partially spherically shaped portion of said stud member; said stud member being arranged for tilting and rotatable movements relative to said bearing means; a yieldable element surrounding said bearing means and engageable with the interior walls of said housing; a closure for the lower end of said housing arranged to exert pressure on said yieldable member for continuously urging said bearing elements into engagement with the enlarged partially spherically shaped portion of the stud member; said closure having a portion in bearing engagement with said second semi-spherically shaped portion of said stud member and a portion in engagement with said bearing means.

2. A joint construction including a housing having a hollow interior; a stud member having an enlarged segmental spherically shaped portion extending into said housing, said stud member having at its lower extremity a semi-spherical projecting portion of lesser dimension than said first mentioned segmental spherically shaped portion; a pair of substantially semi-annular bearing elements in said housing having curved interior surfaces fitting the enlarged segmental spherically shaped portion of said stud member; an annulus of yieldable material surrounding said bearing elements and engageable with the interior walls of said housing; said stud member being arranged for tilting and rotatable movements relative to said bearing means; a metallic closure for the lower end of said housing having a raised peripheral flange portion arranged to engage and exert initial pressure on said yieldable annulus for urging said bearing elements into engagement with the enlarged segmental spherical portion of the stud member, said closure having a concave recess engageable with the semi-spherical portion of the stud member, said closure member being arranged to form with the lower surface of the enlarged segmental spherical portion of said stud member a lubricant chamber.

3. A joint construction including a housing having a hollow interior; a stud member having an enlarged portion extending into said housing; bearing means in said housing having interior surfaces engaging the enlarged portion of said stud member; said stud member being arranged for tilting and rotatable movements relative to said bearing means; a yieldable element interposed between said bearing means and the interior walls of said housing; and a closure for the lower end of said housing having a concave portion in bearing engagement with said stud member and a portion in engagement with said bearing means.

4. A joint construction including a housing having a hollow interior; a stud member having an enlarged partially spherically shaped portion extending into said housing; bearing means in said housing having curved interior surfaces fitting the enlarged partially spherically shaped portion of said stud member; a yieldable element interposed between said bearing means and the interior walls of said housing; a closure for the lower end of said housing arranged to exert pressure on said yieldable member for continuously urging said bearing elements into engagement with the enlarged partially spherically shaped portion of the stud member; said closure having a concave portion in bearing engagement with said stud member and a portion in engagement with said bearing means to position the latter in said housing.

5. A joint construction including a housing having a hollow interior; a stud member having an enlarged partially spherically shaped portion extending into said housing, said stud member having a second semi-spherically shaped portion of lesser dimension arranged beneath said enlarged partially spherically shaped portion; bearing means in said housing engaging the enlarged partially spherically shaped portion of said stud member; a compressible element interposed between said bearing means and the interior walls of said housing; a closure for the lower end of said housing arranged to exert pressure on said yieldable member for continuously urging said bearing elements into engagement with the stud member; said closure having a portion in bearing engagement with the semi-spherically shaped portion of lesser dimension of said stud member and a portion in engagement with said bearing means to position the latter in said housing.

6. A joint construction including a housing having a hollow interior; a stud member having an enlarged segmental spherically shaped portion extending into said housing, said stud member terminating in a semi-spherical projecting portion of lesser diameter than said segmental spherically shaped portion thereof; bearing means in said housing having a curved interior surface fitting the enlarged segmental spherically shaped portion of said stud member; an annulus of yieldable material surrounding said bearing means; a metallic closure for the lower end of said housing having a portion arranged to contact and initially compress said yieldable annulus; said closure having a concave recess engageable with the semi-spherical projecting portion of the stud member and a portion in engagement with said bearing means to position the latter in said housing.

7. A joint construction including a housing having a hollow interior; a stud member having an enlarged segmental spherically shaped portion extending into said housing, said stud member terminating in a semi-spherical projecting portion of lesser dimension than said first mentioned segmental spherically shaped portion; bearing means in said housing having a curved interior surface engaging the enlarged segmental spherically shaped portion of said stud member; said stud member being arranged for tilting movement relative to said bearing means; an annulus of compressible material surrounding said bearing means and engageable with the interior walls of said housing; a metallic closure for the lower end of said housing having a portion arranged to exert initial pressure on said yieldable annulus for urging said bearing means into engagement with the enlarged segmental spherical portion of the stud member, said closure having a concave recess engageable with the semi-spherical projection of the stud member, said closure member being arranged to form with the lower surface of the enlarged segmental spherical portion of said stud member a lubricant chamber.

8. A joint construction including a housing having a hollow interior; a stud member having an enlarged segmental spherically shaped portion extending into said housing, said stud member having at its lower extremity a semi-spherical projecting portion of lesser dimension than said first mentioned segmental spherically shaped portion; a pair of substantially semi-annular bearing elements in said housing having curved interior surfaces fitting the enlarged segmental spherically shaped portion of said stud member; said stud member being arranged for tilting movement relative to said bearing means; an annulus of yieldable material surrounding said bearing elements and engageable with the interior walls of said housing; a metallic closure for the lower end of said housing having a portion arranged to contact and initially compress said yieldable annulus for urging said bearing elements into engagement with the enlarged segmental spherical portion of the stud member, said closure having a concave recess engageable with the semispherical portion of the stud member.

WILLIAM A. FLUMERFELT.